2 Sheets—Sheet 1.
B. KREISCHER.
Burning Kiln.
No. 4,260.
Reissued Feb. 14, 1871.
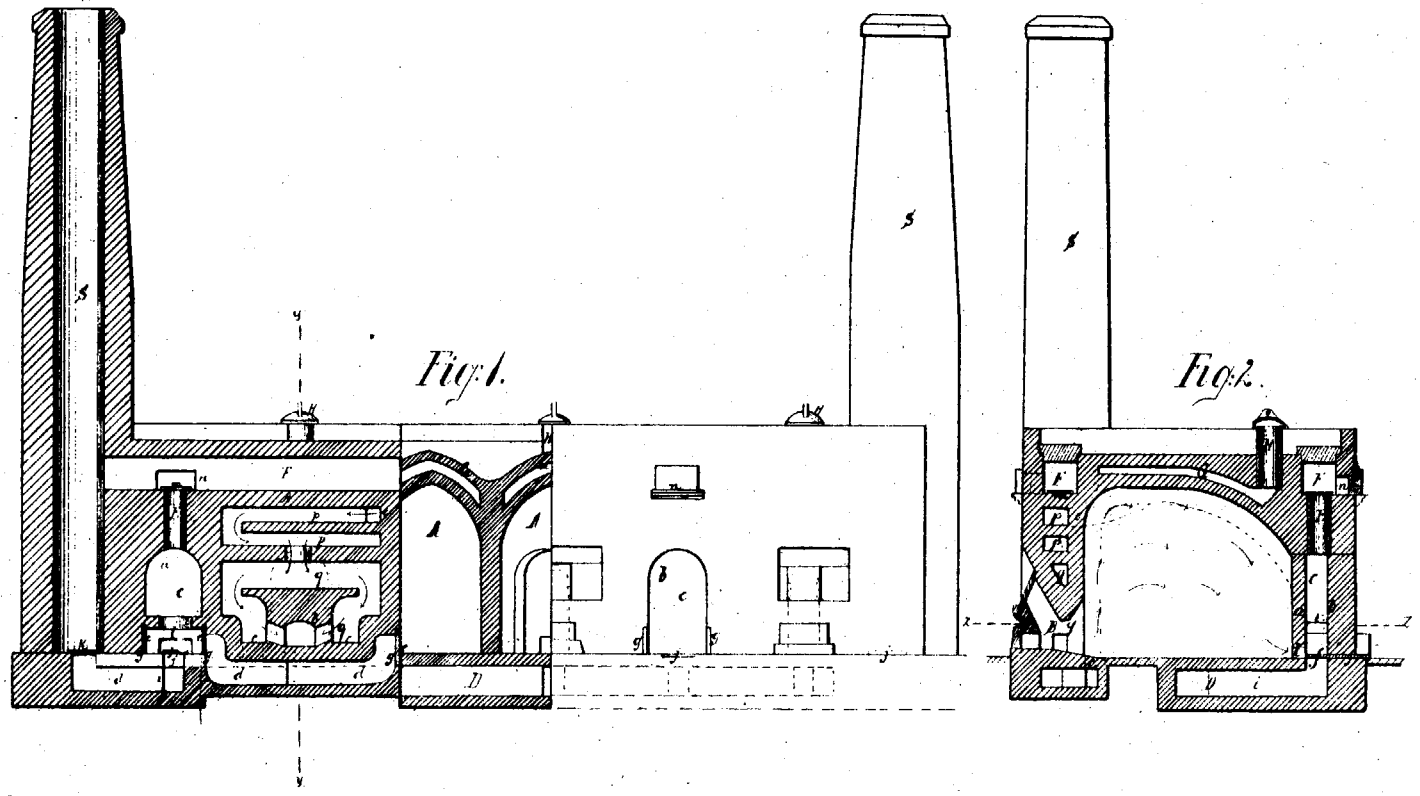
Witnesses
C. Wahlers.
E. F. Kastenhuber
Inventor
Balthasar Kreischer
by
Van Santvoord & Hoyt
Attys 2 Sheets—Sheet 2.

B. KREISCHER.

Burning Kiln.

No. 4,260.

Reissued Feb. 14, 1871.

Witnesses.
C. Wahlers
E. F. Kastenhuber

Inventor.
Balthasar Kreischer
per
Geo. Sanford & Hoyt
Attys.

United States Patent Office.

BALTHASAR KREISCHER, OF NEW YORK, N. Y.

Letters Patent No. 81,793, dated September 1, 1868; reissue No. 4,260, dated February 14, 1871.

IMPROVEMENT IN BURNING-KILNS.

The Schedule referred to in these Letters Patent and making part of the same.

*To all whom it may concern:*

Be it known that I, BALTHASAR KREISCHER, of the city, county, and State of New York, have invented a new and Improved Burning-Kiln; and I do hereby declare the following to be a full, clear, and exact description thereof, which will enable those skilled in the art to make and use the same, reference being had to the accompanying drawing forming part of this specification, in which drawing—

Figure 1 represents a sectional side elevation of a kiln constructed in accordance with my improvement, said view being taken in the plane indicated by the line *x x*, figure 3.

Figure 2 is a transverse section taken in the plane *y y*, fig. 1.

Similar letters indicate corresponding parts.

Figure 3:
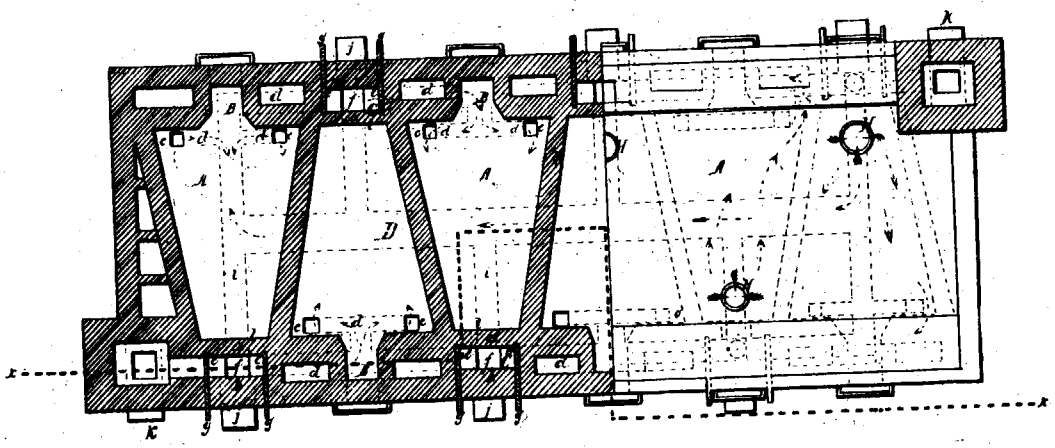
Figure 3 is a sectional plan of the same, the line *z z*, fig. 2, indicating the plane of section.

This my improvement in kilns consists in or embraces the following peculiarities or features, namely:

An arrangement of flues for carrying off the vapors and products of combustion through flues in the doorways of the kiln-chambers directly to the chimneys or smoke-stacks.

Also, an arrangement of flues situated outside the kiln-chambers, and connecting therewith through base-openings, for the purpose of carrying the heat from one kiln-chamber to the next succeding one, or to either of the succeeding kiln-chambers, said outside flues being so arranged and controlled by dampers that either one or more of the kiln-chambers can be cut out, whenever it may be desirable.

Also, a hollow arch, provided with air-supply pipes, and connecting with passages leading to the grate or fire-place, for the purpose of supplying the fire with heated air and saving fuel.

Also, a bottom flue, in combination with the outside flues and with the end chambers in a series, for the purpose of carrying the heat from the last chamber of the series to the first, and also to prevent the moisture of the ground from passing up into the kiln.

In the drawing—

The letters A A A designate a series of kiln-chambers, which are arranged side by side, and of which there may be any desired number, the whole forming one general kiln made up of several chambers that may either be worked separately or in unison, and that have their fire-places, B, disposed alternately on opposite ends, so that, with the aid of suitable flues, the heated gases and products of combustion may be passed, without returning, in a direct manner from one chamber to the next, and so on, if desired, in a zigzag course throughout the series, as will be found hereinafter more fully described.

The kiln-chambers thus arranged to form a row or stack, may be increased in number from time to time, as trade suggests or the circumstances of the proprietor warrant.

Opposite to the fire-place of each chamber is a door or doorway, C, made up of temporary walls, *a b*, (see fig. 2,) which have an open space or passage between them, and which are taken down and built up each time it is required to take out the burnt material and charge anew with green.

Furthermore, the kiln-chambers are so constructed that they are largest at the grate or fire-place end and contract toward the opposite extremity or back, whereby a more uniform distribution of the heat is effected throughout the material contained in each chamber, by reason of the greatest mass being in closest proximity to the fire, and the bulk diminishing in proportion to its distance therefrom; and, furthermore, the heated gases are collected, as it were, in a focus at the narrow back end of one kiln-chamber, prior to being admitted into and expanded in the broad end of the next one, and thereby the heat is reduced and rendered fit for drying green brick or other material contained in the second chamber, while the process of burning the brick or material contained in the first chamber requires a greater heat.

Each kiln-chamber is provided, in its base near its broad or fire-place end, with two or more apertures, *c c*, which communicate with channels, *d d*, that are situated outside of the kiln-chambers, and on opposite sides thereof, and connected to each other by means of transverse channels, *i*, and an intermediate flue, D.

The space between the temporary walls *a b* of the doorway C in each chamber forms a portion of a flue, E, (see fig. 2,) which communicates through an aperture, *m*, with the top flue F, and through apertures, *e*, with the connecting flues *d d*, and through an aperture, *f*, with the branch-flue *i* leading to the intermediate flue D, the aperture *m* being controlled by the damper *n*, the aperture *e* by a damper, *g*, and the aperture *f* by a damper, *j*.

The flue E also communicates, by an opening, *l*, with the interior of the adjoining kiln-chamber.

The kiln is provided with two chimneys, S S, on its opposite ends and on opposite sides of the kiln-chambers, and top flues F on one side of the kiln-chamber communicate with one, and those on the opposite side with the other chimney.

The outside flues *d* also connect with the chimneys in the same manner as the top flues, and the communication between the outside flues and the chimneys is controlled by dampers, *k*, best seen in fig. 1.

Each kiln-chamber is constructed with a double arch, G, (see fig. 2,) the space between which conects by an aperture, *o*, (see fig. 1,) with a series of zigzag channels, *p*, built in the side walls over the fire-places B, and communicating with the fire-places through channels *q*.

The spaces between the double arches also communicate with air-pipes, H, extending out through the top of every kiln-chamber, and provided with covers.

When these covers are removed the external air passes down though the tubes H, spaces G, zigzag channels *p*, and channels *q*, into the fire-places; and, as the air, in passing down through said channels, becomes highly heated, the combustion of the fuel is materially facilitated and a great economy in fuel is effected.

The operation of my kiln is as follows:

Supposing all the kiln-chambers to be filled with green bricks or other material to be burned, the doorways C are all closed, as described, by the temporary walls *a b* and the apertures *c*, *c* in the bottoms of the two end kiln-chambers are covered up. This done a fire is kindled in the first or one end chamber, and the damper *m* in the flue E is opened so as to allow the moisture rising from the green brick or other material to be burned, together with the products of combustion, to pass off through the aperture *l*, flue E, top flue F, into the smoke-stack connecting with said top flue, as indicated by the arrows in fig. 2.

When the steam has all passed off and the material is perfectly dry, or thereabout, the damper *m* is closed and the damper *g* next to the second or adjoining kiln-chamber is opened, and the heat escaping from the first chamber passes through the apertures *l* and *e*, external flue *d*, and apertures *c c* in the bottom of the second chamber, into this chamber, for the purpose of drying and warming the green brick in the same prior to burning it.

The vapor rising from the green material in this second chamber is passed off through apertures *l*, flues E and F, to the smoke-stack, the damper *m* in this second chamber being opened.

When the green material in the second chamber has sufficiently dried, the damper *m* is closed, and the damper *g* opened, and the heat is caused to pass through the third chamber, and so on, until all the kiln-chambers have been added.

Meanwhile, at any period that may be desired, fires may be kindled in the second, in addition to the first kiln-chamber, to effect the burning of the brick, and, in due course of time, in the remaining kiln-chambers.

On arriving at the last chamber of the series, when the first kiln-chamber may, by such time, have been emptied of burned material and refilled with green, the bottom damper *j* in the flue E of the last chamber is opened, and the covers of the apertures *c c* in the first chamber removed, while the damper *n* in the smoke-stack adjoining this first chamber is closed.

The heat of the last chamber will then pass through apertures *l* and *f* and passage *i* and intermediate flue D to the first chamber, entering the same through the base-openings *c c*, for the purpose of drying and warming the green material contained therein, and by opening damper *m* the vapor is carried off through flue E and top flue F to the smoke-stack.

The general and particular operation of the several kiln-chambers is then proceeded with as before.

The passing of the heat along the intermediate flue D prevents absorption of heat by the ground and drawing up of moisture therefrom into the kiln.

It will be apparent, too, from the foregoing description, that either the continuous operations of all the kiln-chambers may be kept up, or either one or more of the chambers may be cut out. For instance, if the operation in the second chamber, fig. 1, is to be interrupted the heat from the first chamber may be made to pass through apertures *l* and *e* to the outside flue *d*, and the base-openings *c c* in the second chamber being shut off through the outside flue and the opening *e* between the second and third chamber to the flue F in said third chamber, and thence through the base-openings *c c*, and outside flue *d* into the flue E, and through this flue and top flue F to the chimney, as will be readily understood by inspecting figs. 1 and 3 of the drawing.

Or, if desired, the intermediate flue D may be brought in operation, in addition to the outside flues *d d*, for the purpose of cutting out one or more of the kiln-chambers, accordingly as demand or repair of certain of said chambers or other circumstances may require.

What I claim as new, and desire to secure by Letters Patent, is—

1. The arrangement of flues F F, controlled by dampers *m*, substantially as herein described, for carrying off the vapor and the products of combustion, and openings *e f*, controlled by dampers *g* and *j*, and flues *d*, communicating with an adjoining kiln-chamber or intermediate flue D, as required.

2. The flues F F, in combination with flues or passages E in the hollow doorways C, substantially as described.

3. The double arch G in the kiln-chambers, in combination with openings or tubes H, and with a chamber or passages, *p*, connecting with the grate or fire-place, as herein set forth.

4. The outside flues *d d*, connecting with the kiln-chambers through base-openings *c c*, provided with dampers *g* and *j*, and serving to carry the heat from one kiln-chamber to either of the succeeding chambers, or to the smoke-stack, substantially as described.

The bottom flue D, provided with branches running to or from the kiln-chambers, in combination with the outside flues *d d*, when constructed and arranged substantially as described.

BALTHASAR KREISCHER.

Witnesses:

W. HAUFF,

E. F. KASTENHUBER.